US011614210B2

(12) United States Patent
McGovern

(10) Patent No.: US 11,614,210 B2
(45) Date of Patent: Mar. 28, 2023

(54) RESIDENTIAL EMERGENCY LIGHTING SYSTEM

(71) Applicant: James McGovern, Milton, WI (US)

(72) Inventor: James McGovern, Milton, WI (US)

( * ) Notice: Subject to any disclaimer, the term of this patent is extended or adjusted under 35 U.S.C. 154(b) by 219 days.

(21) Appl. No.: 16/871,334

(22) Filed: May 11, 2020

(65) Prior Publication Data

US 2021/0348731 A1    Nov. 11, 2021

(51) Int. Cl.
| F21S 9/02 | (2006.01) |
| F21V 33/00 | (2006.01) |
| H05B 47/155 | (2020.01) |
| H05B 47/165 | (2020.01) |
| H05B 47/105 | (2020.01) |
| H01R 13/717 | (2006.01) |
| F21V 23/00 | (2015.01) |
| F21S 8/00 | (2006.01) |
| H02J 9/06 | (2006.01) |

(52) U.S. Cl.
CPC .............. *F21S 9/022* (2013.01); *F21S 8/033* (2013.01); *F21V 23/006* (2013.01); *F21V 33/0076* (2013.01); *H01R 13/717* (2013.01); *H02J 9/065* (2013.01); *H05B 47/105* (2020.01); *H05B 47/155* (2020.01); *H05B 47/165* (2020.01)

(58) Field of Classification Search
CPC .......... F21S 9/022; F21S 8/033; H05B 47/165
See application file for complete search history.

(56) References Cited

U.S. PATENT DOCUMENTS

| 6,150,943 | A | * | 11/2000 | Lehman | ................. G08B 7/062 340/332 |
| 8,912,442 | B2 |  | 12/2014 | Smith |  |
| 9,035,180 | B2 |  | 5/2015 | Smith et al. |  |
| 9,035,181 | B2 |  | 5/2015 | Smith et al. |  |
| 9,362,728 | B2 |  | 6/2016 | Smith et al. |  |
| 9,482,426 | B2 |  | 11/2016 | Diotte |  |
| D781,241 | S |  | 3/2017 | Knight |  |
| 9,742,111 | B2 |  | 8/2017 | Smith et al. |  |
| 9,755,374 | B2 |  | 9/2017 | St. Laurent et al. |  |
| 9,768,562 | B2 |  | 9/2017 | Smith et al. |  |
| 9,774,154 | B2 |  | 9/2017 | St. Laurent et al. |  |
| 9,787,025 | B2 |  | 10/2017 | Smith et al. |  |
| 9,807,829 | B2 |  | 10/2017 | Jensen |  |
| 9,832,841 | B2 |  | 11/2017 | Knight et al. |  |
| 9,871,324 | B2 |  | 1/2018 | Smith et al. |  |
| 9,882,318 | B2 |  | 1/2018 | Smith et al. |  |
| 9,882,361 | B2 |  | 1/2018 | Smith et al. |  |
| D809,899 | S |  | 2/2018 | Knight et al. |  |
| D810,697 | S |  | 2/2018 | Smith |  |
| 9,899,814 | B2 |  | 2/2018 | Smith et al. |  |
| 9,917,430 | B2 |  | 3/2018 | Smith et al. |  |

(Continued)

*Primary Examiner* — Jany Richardson
(74) *Attorney, Agent, or Firm* — Foley & Lardner LLP

(57) ABSTRACT

A lighting system for an electrical device includes one or more light sources coupled to an electrical outlet. The one or more light sources are configured to receive power from a power supply and configured to generate output light on at least one side edge of the electrical device. The lighting system includes a controller communicatively coupled to the one or more light sources. The controller is configured to receive a signal from an auxiliary unit and control the one or more light sources to operate between an on-state and an off-state responsive to the signal from the auxiliary unit.

17 Claims, 10 Drawing Sheets

(56) References Cited

U.S. PATENT DOCUMENTS

| | | |
|---|---|---|
| D819,426 S | 6/2018 | Smith et al. |
| D832,223 S | 10/2018 | Knight |
| D832,224 S | 10/2018 | Knight et al. |
| 10,109,945 B2 | 10/2018 | Smith et al. |
| D842,075 S | 3/2019 | Knight |
| D842,076 S | 3/2019 | Knight |
| D845,108 S | 4/2019 | Knight |
| D847,608 S | 5/2019 | Knight |
| D849,510 S | 5/2019 | Knight et al. |
| D849,511 S | 5/2019 | Knight |
| D849,512 S | 5/2019 | Knight et al. |
| D849,513 S | 5/2019 | Knight et al. |
| 10,291,007 B2 | 5/2019 | Smith et al. |
| 10,373,773 B2 | 8/2019 | Smith et al. |
| 10,381,788 B2 | 8/2019 | Smith et al. |
| 10,381,789 B2 | 8/2019 | Smith et al. |
| 10,404,045 B2 | 9/2019 | Smith et al. |
| 10,468,834 B2 | 11/2019 | Diotte |
| D877,599 S | 3/2020 | Knight |
| D881,137 S | 4/2020 | Knight et al. |
| 2012/0092183 A1* | 4/2012 | Corbett .................. G08B 7/066 |
| | | 340/815.4 |
| 2019/0098725 A1* | 3/2019 | Sadwick ................... F21S 2/00 |

* cited by examiner

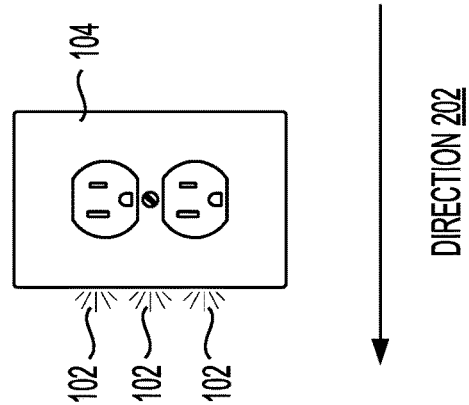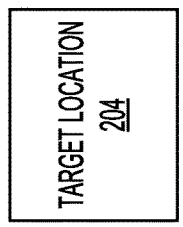
FIG. 3

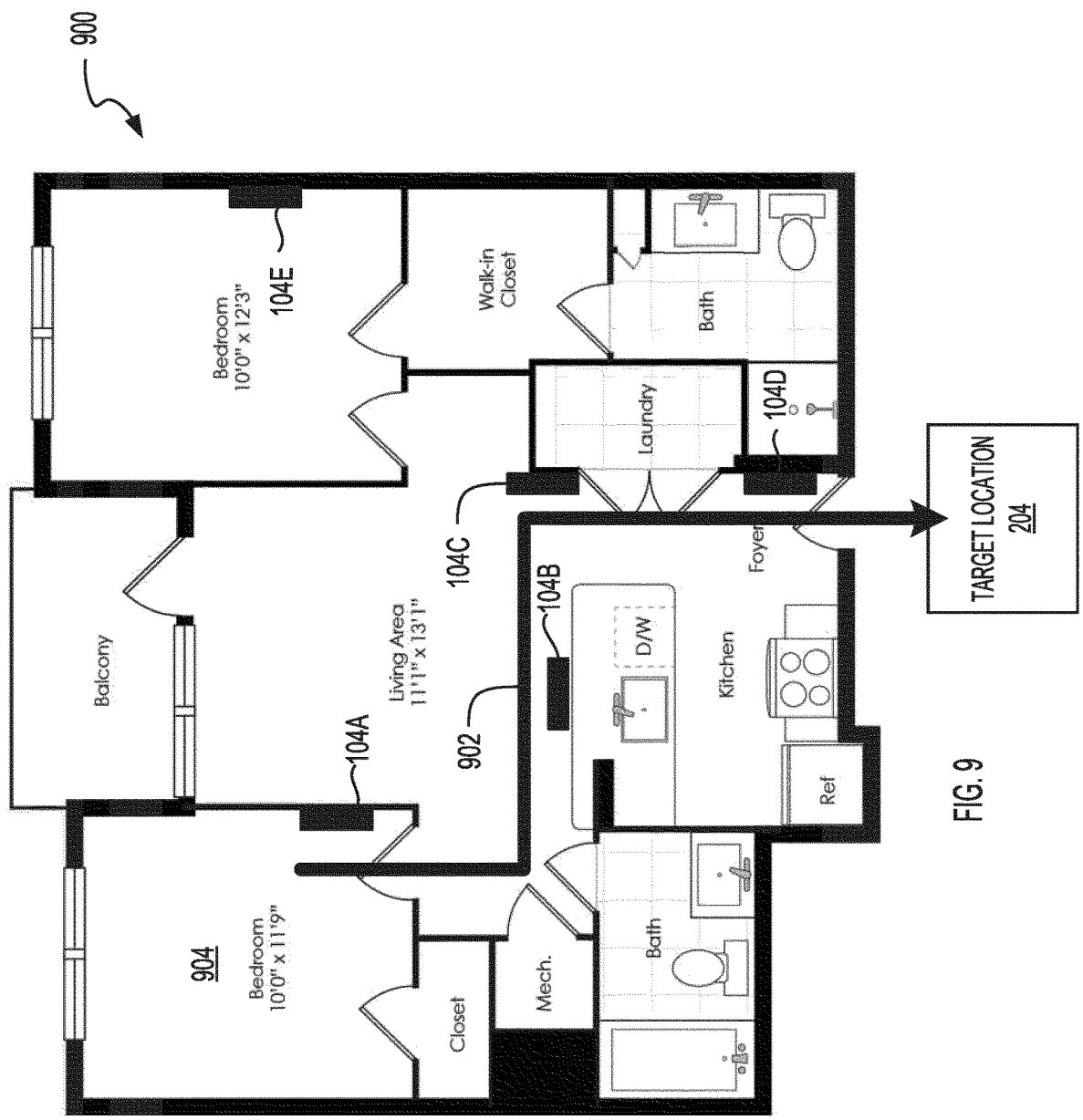

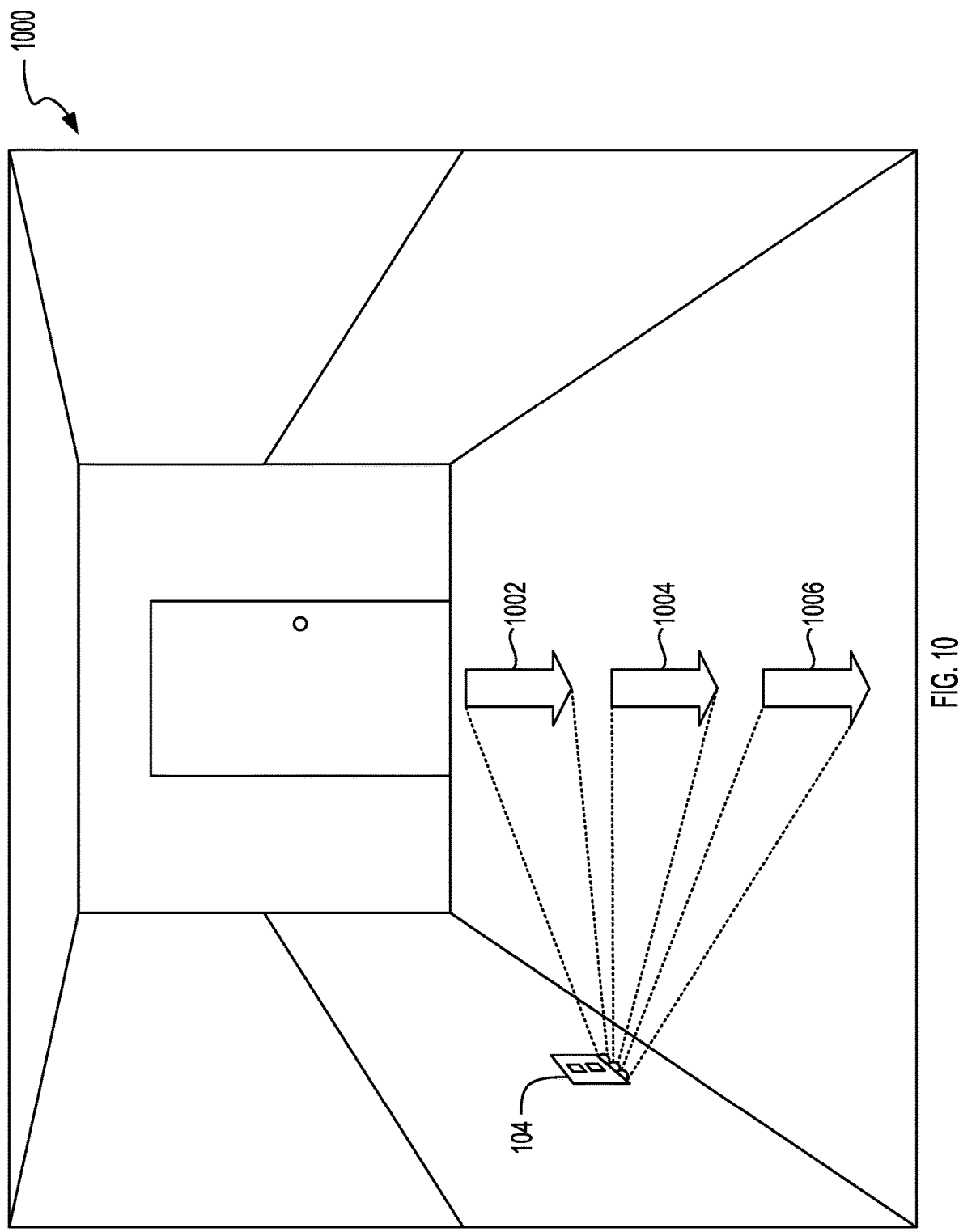

RESIDENTIAL EMERGENCY LIGHTING SYSTEM

TECHNICAL FIELD

The present application relates generally to emergency lighting systems.

BACKGROUND

Lighting systems can be coupled to electrically powered wall mounted devices.

SUMMARY

In a residential emergency situation, such as a home fire or natural gas leak, it may be challenging for persons to determine a viable escape route. For example, a smoke filled room or barrier blocking an exit can be obstacles for escape. The systems of the present disclosure provide a residential emergency lighting system that can indicate an escape route from these dangerous situations. This lighting system can use visuals, such as lights blinking in a sequential manner, to indicate an escape path. In addition, the lighting system can include a controller which can determine, between multiple escape route options, which route is likely to be viable.

At least one aspect of the present disclosure is directed to a lighting system for an electrical device. The system includes one or more light sources coupled to an electrical outlet. The one or more light sources are configured to receive power from a power supply and configured to generate output light on at least one side edge of the electrical device. The system includes a controller communicatively coupled to the one or more light sources. The controller is configured to receive a signal from an auxiliary unit. The controller is configured to control the one or more light sources to operate between an on-state and an off-state responsive to the signal from the auxiliary unit.

Another aspect of the present disclosure is directed to a lighting system for electrical devices. The system includes a first light source coupled to a first electrical outlet. The first light source is configured to generate a first output light on a first side edge of a first electrical device of the electrical devices. The system includes a second light source coupled to a second electrical outlet. The second light source is configured to generate a second output light on a second side edge of a second electrical device of the electrical devices. The system includes a third light source coupled to a third electrical outlet. The third light source is configured to generate a third output light on a third side edge of a third electrical device of the electrical devices. The system includes a controller communicatively coupled to the first light source, the second light source, and the third light source. The controller is configured to receive a signal from a secondary unit. The controller is configured to control the first light source, the second light source, and the third light source to operate between a lit state and an unlit state responsive to the signal from the secondary unit.

Another aspect of the present disclosure is directed to an emergency exit lighting system for a building. The system includes a first light source coupled to a first electrical outlet. The first light source is configured to generate a first light signal. The system includes a second light source coupled to a second electrical outlet. The second light source is configured to generate a second light signal. The system includes a third light source coupled to a third electrical outlet. The third light source configured to generate a third light signal. The system includes a controller communicatively coupled to the first light source, the second light source, and the third light source. The controller is configured to receive an emergency signal from a secondary unit indicating a presence of an emergency exit condition. In response to the emergency signal, the controller is configured to control a sequentially progressing illumination pattern of the first light signal, the second light signal and the third light signal to create a directional indication visually leading toward an exit location from the building.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 3 illustrates a lighting system for an electrical device, according to an embodiment.

FIG. 9 illustrates a floor plan of a building and a path from a room to a target location, according to an embodiment.

FIG. 10 illustrates one of the electrical devices projecting a path onto a floor of a hallway, according to an embodiment.

Like reference numbers and designations in the various drawings indicate like elements.

DETAILED DESCRIPTION

Following below are more detailed descriptions of various concepts related to, and implementations of, methods, apparatuses, and systems for emergency lighting systems. The various concepts introduced above and discussed in greater detail below may be implemented in any of a number of ways, as the described concepts are not limited to any particular manner of implementation. Examples of specific implementations and applications are provided primarily for illustrative purposes.

Figure 1:
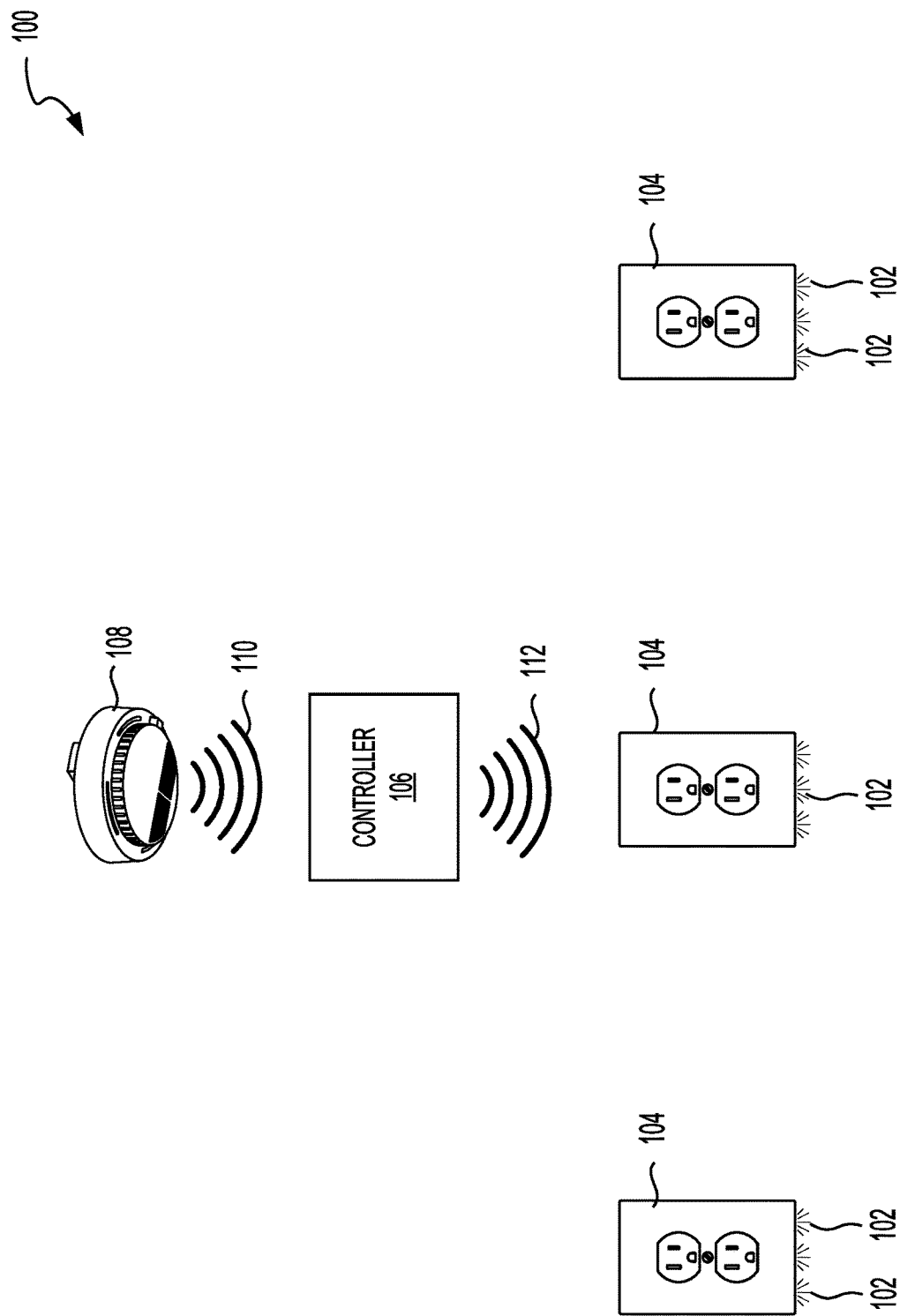
FIG. 1 illustrates a lighting system for electrical devices, according to an embodiment.
Figure 8B:
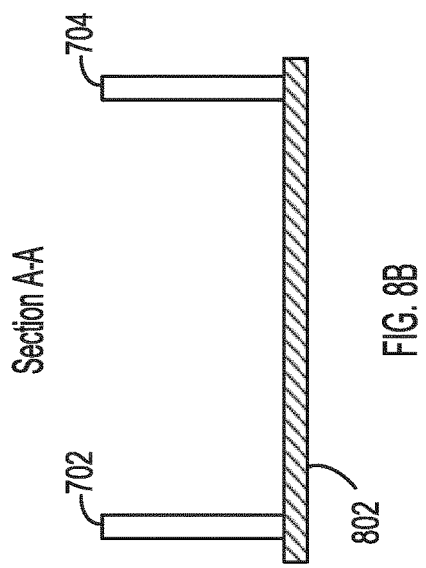
FIG. 8B illustrates a cross-sectional view of one of the electrical devices, according to an embodiment.
Figure 8A:
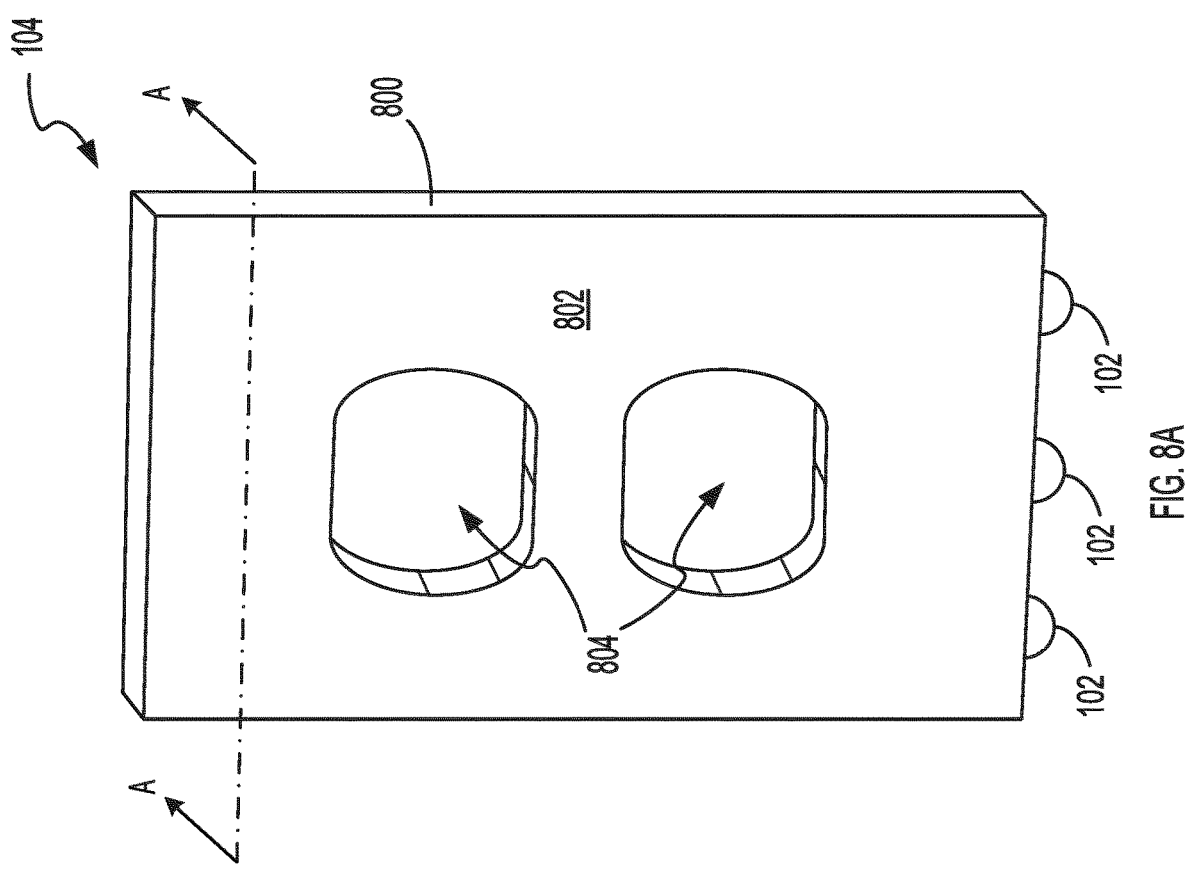
FIG. 8A illustrates a perspective view of one of the electrical devices, according to an embodiment.

FIG. 1 illustrates a lighting system 100 for electrical devices 104 (e.g., electrical outlet, power outlet, outlet cover plate, etc.). The lighting system 100 includes one or more electrical devices 104. In some embodiments, each electrical device 104 is shaped as a cover plate for an electric power outlet. For example, FIG. 8A illustrates a perspective view of the electrical device 104. The electrical device 104 is shown to include a housing 800 having a front surface 802 and a pair of holes 804. The holes 804 may be configured to align with the electrical sockets of a power outlet, such as a standard wall-mounted power outlet. In this regard, the electrical device 104 may replace an ordinary cover plate for the power outlet.

Each of the electrical devices 104 may be coupled to one or more light sources 102. The one or more light sources 102 can include light emitting diodes (LEDs). The one or more light sources 102 may be attached to one or more side surfaces or edges of the electrical devices 104. In FIGS. 1 and 8A, the one or more light sources are shown attached to a bottom surface of the electrical devices 104 (i.e., the surface facing toward the ground when the electrical devices are installed over an electrical outlet). However, it should be understood that the one or more light sources can be coupled to any surface of the electrical devices (e.g., top, bottom, front, left side, right side, etc.).

The one or more light sources 102 are configured to receive power from a power supply. For example, the power supply can include a residential electrical supply, a generator, or a battery. In some embodiments, the electrical devices 104 contain one or more batteries configured to supply power to the one or more light sources 102. In some embodiments, the electrical devices 104 include power connectors 702-704 (shown in FIG. 8B) configured to supply power to the electrical devices 104. The power connectors 702-704 may extend from a rear surface of the electrical devices 104 (i.e., the surface facing toward the wall when the electrical devices 104 are installed) such that the power connectors 702-704 extend into the wall. The power connectors 702-704 may be configured to align with the screws on the sides of the electrical outlet that fasten the power wires to the electrical outlet. The power connectors 702-704 may make electrical contact with the screws on the sides of the power outlet (e.g., by clipping onto the screws from the sides) and draw power from the residential power supply that supplies power to the electrical outlet.

The one or more light sources 102 can be connected to a power circuitry within the electrical devices 104. The electrical device 104 can include a wall-mounted electrical device or an electrical wiring device. The electrical device 104 can include power outlet receptacles. The electrical device 104 can include a power outlet, a power socket, an electrical light switch, a cover plate for a power outlet or wall switch, or a low voltage device. The electrical device 104 can be mounted within a wall-box housing or a junction box. The wall-box housing or the junction box can be configured to receive power lines. The one or more light sources 102 can draw current from the power lines to produce white or colored light.

Each of the one or more light sources 102 can be connected by wiring (e.g., house wiring) to each of the remaining one or more light sources 102. The one or more light sources 102 can be separately wired together to form a circuit within the electrical device 104. The one or more light sources 102 can be disposed on a printed circuit board. The printed circuit board can be disposed within the electrical device 104. The one or more light sources can communicate light outwardly from the electrical device 104. The one or more light sources 102 can be disposed within the electrical device 104 or multiple electrical devices 104. The one or more light sources 102 can protrude beyond the plane of a wall to allow for light from the one or more light sources 102 to be projected outwardly from the electrical device 104.

The one or more light sources 102 are configured to generate output light on at least one side edge of the electrical device 104. For example, the one or more light sources 102 can be disposed on a bottom edge of the electrical device 104 or a top edge of the electrical device 104. The one or more light sources 102 can be disposed on the electrical device 104 such that light from the one or more light sources 102 is emitted in an outward direction from the electrical device 104. The light from the one or more light sources 102 can illuminate a path. For example, the light from the one or more light sources 102 can indicate a path to a target location (e.g., an exit, a door, a doorway, etc.).

The lighting system 100 includes a controller 106 communicatively coupled to the one or more light sources 102. The controller 106 can be coupled to the one or more light sources 102 through a wired connection. For example, the controller 106 can be hardwired to the one or more light sources 102. The controller 106 is configured to receive a signal 110 from an auxiliary unit 108 (e.g., secondary unit, backup unit, etc.). The auxiliary unit 108 can be a smoke detector, heat sensor, or an alarm system (e.g., smoke alarm system, carbon monoxide alarm system, natural gas alarm system, etc.). The signal 110 can be an audio signal. For example, the controller 106 can be configured to activate the one or more light sources 102 responsive to an audio alarm. The auxiliary unit 108 can communicate with the controller 106 through a wired or wireless connection.

The controller 106 is configured to control the one or more light sources 102 to operate between an on-state and an off-state responsive to the signal from the auxiliary unit 108. For example, the controller 106 can activate or trigger the one or more light sources 102 to be in an on-state (e.g., turned on, emitting light, flashing, etc.). The controller 106 can activate or trigger the one or more light sources 102 to be in an off-state (e.g., turned off, not emitting light, etc.). The controller 106 can send a signal 112 to the electrical devices 104. The one or more light sources 102 can, responsive from the signal 112 from the controller 106, operate between the on-state and the off-state. The controller 106 can connect or disconnect a circuit to control the one or more light sources 102.

In some embodiments, the lighting system 100 includes a first light source of the one or more light sources 102 coupled to a first electrical outlet. The first light source is configured to generate a first output light on a first side edge of a first electrical device of the electrical devices. The first light source can be communicatively coupled to the controller 106. For example, the first light source can receive a signal 112 from the controller 106.

The lighting system 100 includes a second light of the one or more light sources 102 source coupled to a second electrical outlet. The second electrical outlet can be different from the first electrical outlet. The second light source is configured to generate a second output light on a second side edge of a second electrical device of the electrical devices. The second light source can be communicatively coupled to the controller 106. For example, the second light source can receive a signal 112 from the controller 106.

The lighting system 100 includes a third light source of the one or more light sources 102 coupled to a third electrical outlet. The third electrical outlet can be different from the first electrical outlet and the second electrical outlet. The third light source is configured to generate a third output light on a third side edge of a third electrical device of the electrical devices. The third light source can be communicatively coupled to the controller 106. For example, the third light source can receive a signal 112 from the controller 106. Although three light sources are described to show and explain one embodiment of the system, any number of light sources may be used and coupled to the controller 106 to provide for a particular emergency exit indication strategy for a particular building, passageway, or situation.

The lighting system 100 includes a controller 106 communicatively coupled to the first light source, the second light source, and the third light source. For example, the controller 106 can be electrically connected to the first light source, the second light source, and the third light source. The controller 106 is configured to receive a signal 112 from the auxiliary unit 108 (e.g., secondary unit). The secondary unit can include a smoke detector, a heat detector, or a sprinkler activation signal.

The controller 106 is configured to control the first light source, the second light source, and the third light source to operate between a lit state and an unlit state responsive to the signal from the secondary unit. For example, the controller 106 can send a signal 112 to the first light source to enter into a lit state. A lit state can include an on-state, a dim state, a partially-on state, or a color emitting state. The controller 106 can send a signal 112 to the second light source to enter into an unlit state. An unlit state can include an off-state, a powered light-off state, or a dim state. The controller 106 can send a signal 112 to the one or more light sources 102 to enter into a flashing state.

The controller 106 is configured to control the first light source, the second light source, and the third light source responsive to an alarm. For example, the controller 106 can activate all, none, or a subset of the light sources responsive to an alarm. The controller 106 can receive an audio signal from the alarm. The alarm can be part of an alarm system that includes the controller 106. The controller 106 can be electrically coupled to the alarm.

The lighting system 100 can include one or more batteries configured to supply power to the first light source, the second light source, and the third light source. The first light source, second light source, and the third light source can be configured to receive power from a power supply. For example, the power supply can include a residential electrical supply, a generator, or a battery. Accordingly, the lighting system may be powered from a normal residential power supply, of from backup sources, such as batteries or a generator during events that cause a loss of normal power to the light sources.

Figure 2:
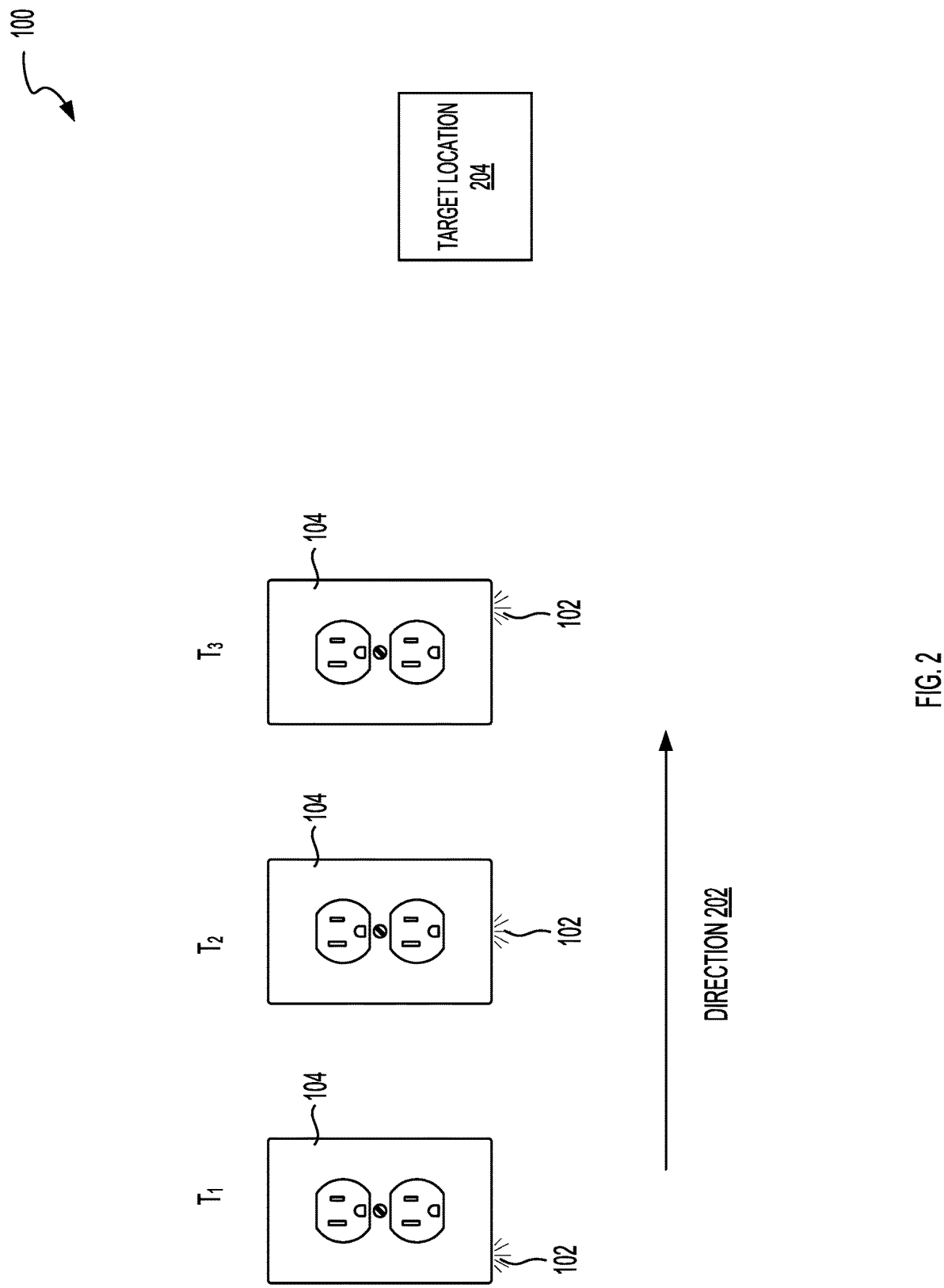
FIG. 2 illustrates a lighting system for electrical devices, according to an embodiment.

FIG. 2 illustrates a lighting system for electrical devices. The controller 106 can be configured to determine a target location 204 (e.g., an exit, an escape, a door, a window, a gathering point, etc.). The controller 106 can control the first light source, the second light source, and the third light source to blink in a sequential pattern responsive to the signal from the secondary unit. The first light source, the second light source, and the third light source can be part of the same electrical device 104. The controller 106 can control the first light source of an electrical device 104 to blink at time=$T_1$. The controller 106 can control the second light source of the electrical device 104 to blink at time=$T_2$. The controller 106 can control the third light source of the electrical device 104 to blink at time=$T_3$. The controller 106 can control the first light source, the second light source, and the third light source to blink in a repeated fashion. The direction of the blinking (e.g., flashing) light sources can indication a direction 202 of the target location 204. The controller 106 can be configured to control the first light source, the second light source, and the third light source to blink in a pattern based on the direction 202 of the target location 204. The controller 106 can be configured to control the first light source, the second light source, and the third light source to blink directionally and draw a path to the target location 204. The controller 106 can be configured to control the one or more light sources 102 to operate sequentially (e.g. progressively, etc.) between the on-state and the off-state to indicate a pathway or direction 202 of the target location 204. The light from the one or more light sources 102 can also illuminate a path to the target location 204.

FIG. 3 illustrates a lighting system 100 for an electrical device 104. The one or more light sources 102 are configured to generate output light on at least one side edge of the electrical device 104. The one or more light sources 102 can be disposed on a side edge of the electrical device 104. For example, the one or more light sources 102 can be disposed on a left side edge of the electrical device 104 to indicate a direction 202 that is leftward. The one or more light sources 102 can be disposed on a right side edge of the electrical device 104 to indicate a direction 202 that is rightward.

The controller 106 is configured to control the one or more light sources 102 to generate the output light on an indicator side of the at least one side edge of the electrical device, the indicator side to indicate a direction 202 of a target location 204. For example, the one or more light sources 102 located on the left side edge of the electrical device 104 can be put into an on-state by the controller 106. The on-state of the one or more light sources 102 located on the left side edge of the electrical device 104 can indicate that the direction 202 of the target location 204 is leftward. The one or more light sources 102 located on the right side edge of the electrical device 104 can be put into an off-state by the controller 106. The off-state of the one or more light sources 102 located on the right side edge of the electrical device 104 can indicate that the direction 202 of the target location 204 is leftward.

Figure 4:
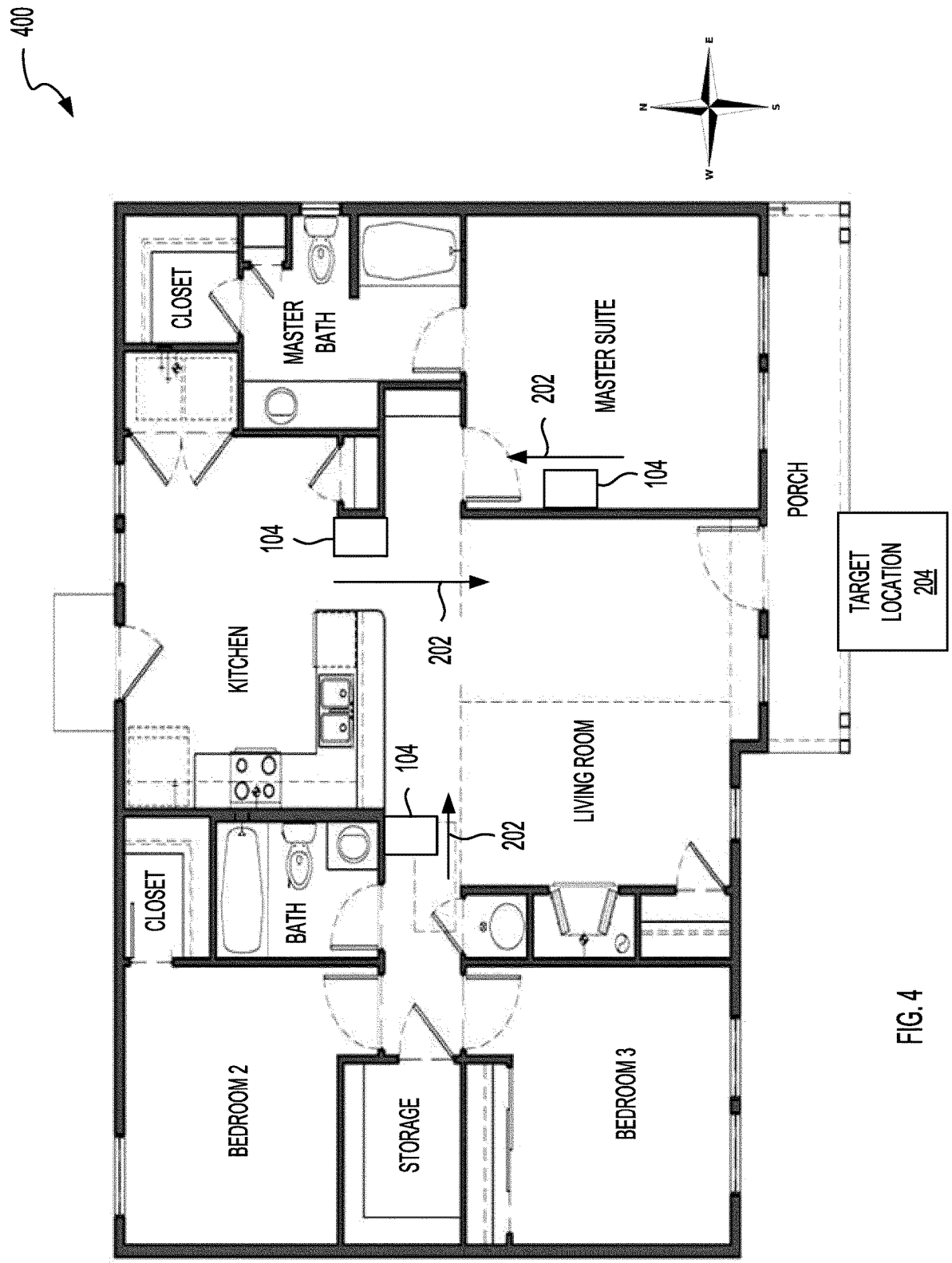
FIG. 4 illustrates an emergency exit lighting system for a building, according to an embodiment.

FIG. 4 illustrates an emergency exit lighting system 400 for a building. The emergency exit lighting system 400 can include the lighting system 100. The emergency exit lighting system 400 can include a controller 106. The controller 106 can determine a path to a target location. For example, the controller 106 can determine a path to the target location 204 that includes a direction 202. The controller 106 can determine that the target location 204 is located on an exterior of the building outside.

The controller 106 can control the one or more light sources 102 to operate sequentially between the on-state and the off-state to indicate the path to the target location 204. For example, the one or more light sources 102 coupled to the electrical devices 104 can operate between the on-state and the off-state to indicate the path to the target location 204. For example, the target location 204 can be located outside of the building just outside of the front door. The light source 102 coupled to the electrical device 104 in the living room can indicate that the direction 202 of the target location 204 is east. The light source 102 coupled to the electrical device 104 in the kitchen can indicate that the direction 202 of the target location 204 is south. The controller 106 can control the first light source, the second light source, and the third light source to operate sequentially between the lit state and the unlit state to indicate the path to the target location. For example, the controller 106 can control the first light source, the second light source, and the third light source of an electrical device 104 to operate sequentially between a lit state and an unlit to indicate that the direction of the target location, relative to a location west of the living room, is south and east.

The emergency exit lighting system 400 can include a first light source coupled to a first electrical outlet, the first light source configured to generate a first light signal. The emergency exit lighting system 400 can include a second light source coupled to a second electrical outlet, the second light source configured to generate a second light signal. The emergency exit lighting system 400 can include a third light source coupled to a third electrical outlet, the third light source configured to generate a third light signal.

The emergency exit lighting system 400 can include a controller 106 communicatively coupled to the first light source, the second light source, and the third light source. The controller 106 can be configured to receive an emergency signal from a secondary unit indicating a presence of an emergency exit condition. The controller 106 can, in response to the emergency signal, control a sequentially progressing illumination pattern of the first light signal, the second light signal and the third light signal to create a directional indication (e.g. the appearance of a repeating 'motion' as the lights sequentially flash in a particular order) visually leading toward an exit location from the building.

Figure 5:
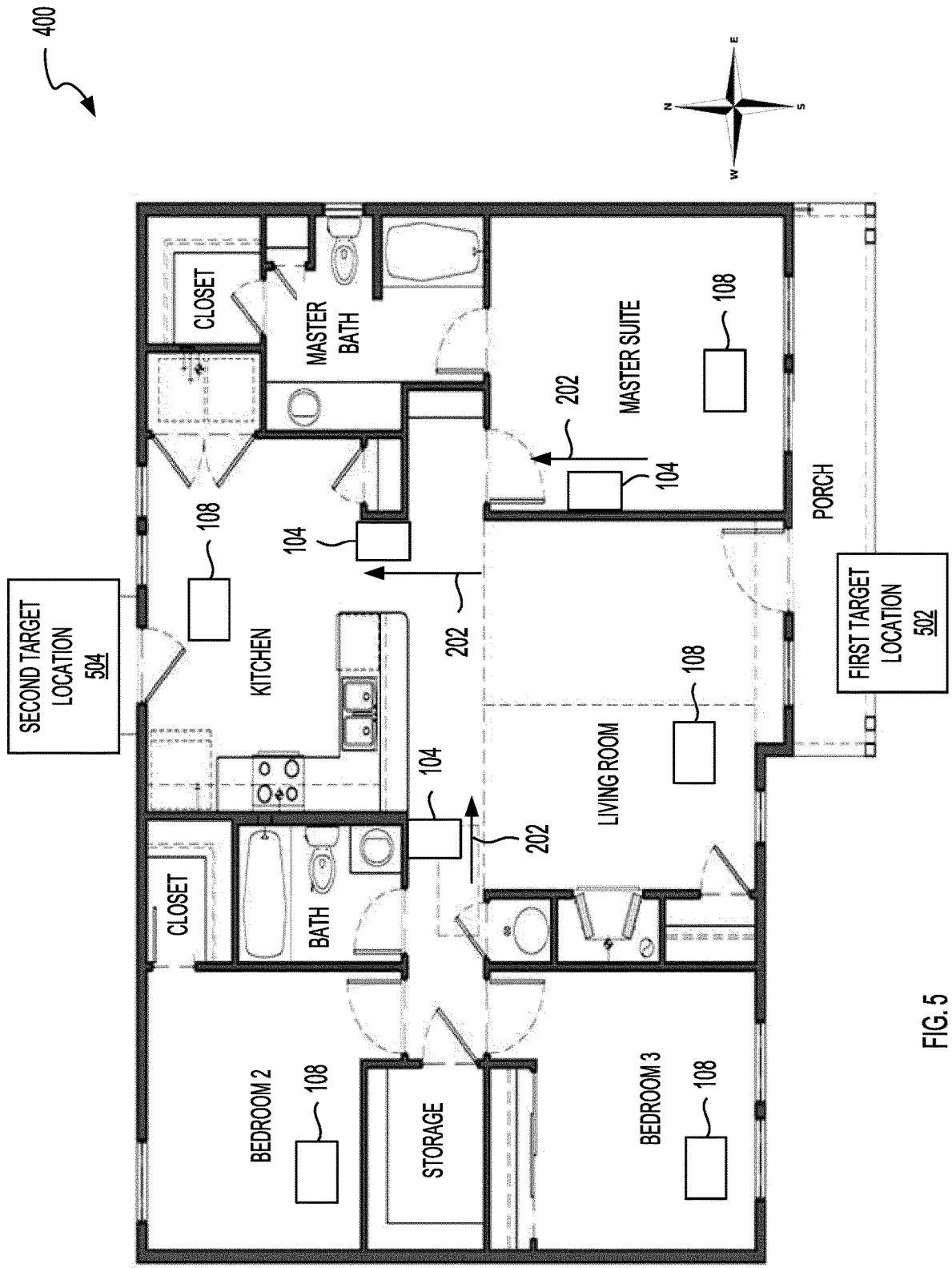
FIG. 5 illustrates an emergency exit lighting system for a building, according to an embodiment.

FIG. 5 illustrates an emergency exit lighting system 400 for a building. The controller 106 can be configured to determine a first target location 502. The first target location 502 can be selected (e.g., identified) by the controller 106 as a baseline target location for an escape route.

The controller 106 can determine, based on a location of the auxiliary unit 108, that the first target location 502 is inaccessible. The controller 106 can determine that a signal from the auxiliary unit 108 located in the living room may indicate that a blockage of the exit route to the first target location 502. For example, the controller 106 can determine that the signal from the auxiliary unit located in the living room indicates a potential issue with exiting through the front door to the first target location 502.

The controller 106 can control the one or more light sources 102 to operate sequentially between the on-state and the off-state to indicate a direction of a second target location 504. For example, the target location 204 can be located on the exterior of the building just outside of the kitchen door. The light source 102 coupled to the electrical device 104 in the living room can indicate that the direction 202 of the target location 204 is east. The light source 102 coupled to the electrical device 104 in the kitchen can indicate that the direction 202 of the target location 204 is north. The controller 106 can control the first light source, the second light source, and the third light source to operate sequentially between the lit state and the unlit state to indicate the path to the target location. For example, the controller 106 can control the first light source, the second light source, and the third light source of an electrical device 104 to operate sequentially between a lit state and an unlit to indicate that the direction of the target location, relative to a location west of the living room, is north and east.

In some embodiments, the controller 106 can control the one or more light sources 102 to generate the output light on an indicator side of the at least one side edge of the electrical device, the indicator side to indicate a direction 202 of a target location (e.g., the second target location).

The controller 106 can determine a first target location 502. The controller 106 can determine, based on a location of the secondary unit, that the first target location 502 is inaccessible. The controller 106 can control the first light source, the second light source, and the third light source to operate sequentially between the lit state and the unlit state to indicate a direction of a second target location 504.

The controller 106 can be further configured to recognize a location of the emergency exit condition from the secondary unit, and if the location is proximate the exit location (e.g., first target location), create a new sequentially progressing illumination pattern of the first light signal, the second light signal and the third light signal to create a directional indication visually leading toward an alternative exit location from the building. The alternative exit location can include the second target location 504. The controller 106 can be configured to indicate a direction 202 of the second target location 504 that is away from the auxiliary unit 108 located in the living room.

Figure 6:
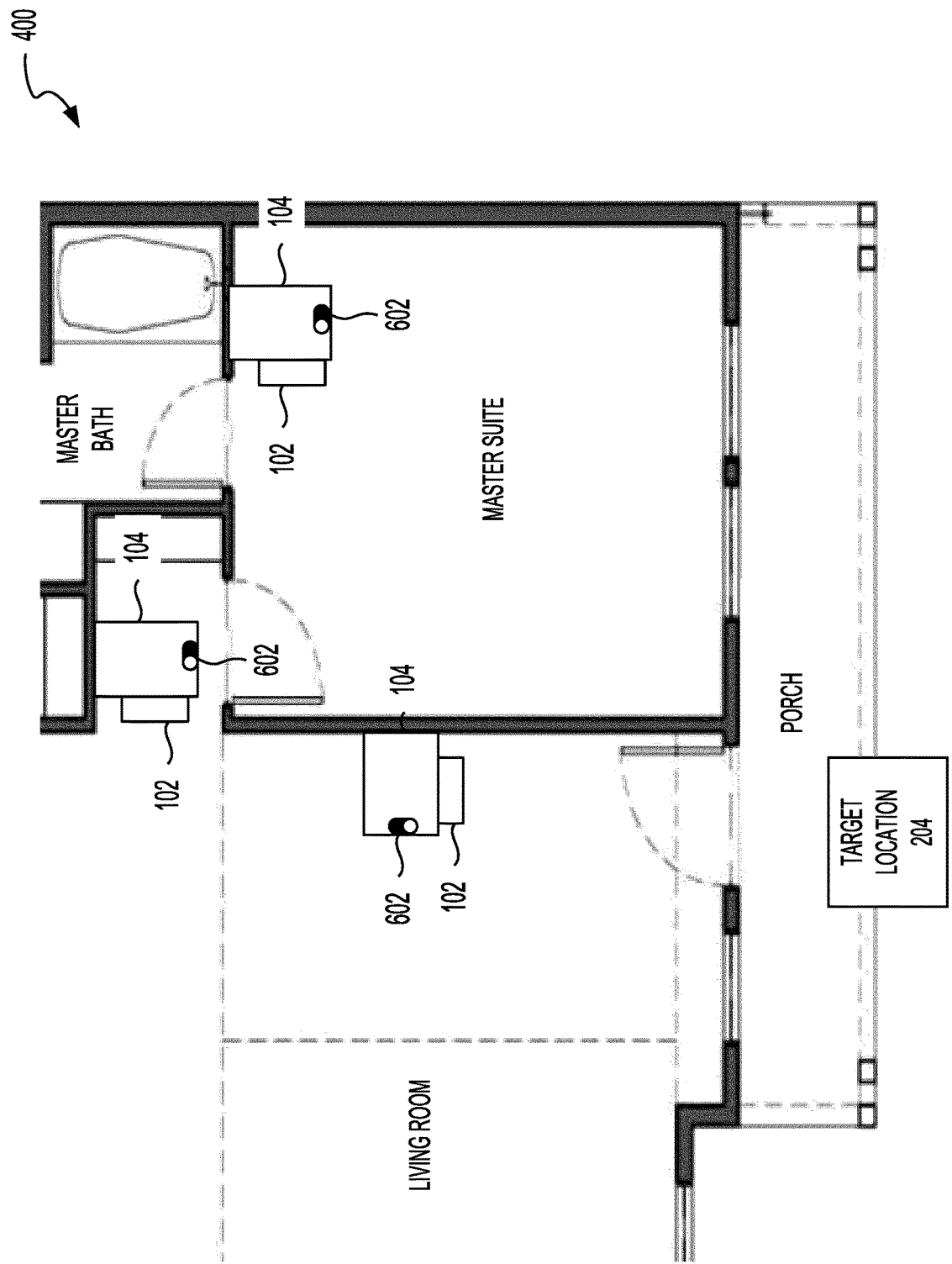
FIG. 6 illustrates an emergency exit lighting system for a building, according to an embodiment.

FIG. 6 illustrates an emergency exit lighting system 400 for a building, according to an embodiment. The controller 106 is configured to control the one or more light sources 102 to generate the output light on an indicator side of the at least one side edge of the electrical device 104 based on a position of a toggle switch 602 (e.g., toggle). The toggle switch 602 can indicate the direction of a nearby target location. For example, the toggle switch 602 can operate between discrete positions to open or close an electrical circuit coupled to the one or more light sources 102. The position of the toggle switch 602 can determine the indicator side of the at least one side edge of the electrical device. For example, the toggle switch 602 can be located on the left side of the electrical device 104. The one or more light sources 102 on the left side of the electrical device 104 can blink to indicate that the target location is located left of the electrical device 104. The toggle switch 602 can be located on the right side of the electrical device 104. The one or more light sources 102 on the right side of the electrical device 104 can blink to indicate that the target location is located right of the electrical device 104. A user can manually position the toggle switch 602 to indicate a direction of the target location 204. In this way, the user can manually define an exit path from various points in a building. The toggle switch 602 can be disposed on the electrical device 104.

In some embodiments, an electrical device attachment can include one or more light sources 102. The electrical device attachment can include a toggle switch 602. The electrical device attachment can be coupled to the electrical device 104. For example, the electrical device attachment can include an outlet cover plate or faceplate. The direction that the one or more light sources 102 emit light can be determined based on the position of the toggle switch 602. A user can manually determine the direction of light emitted by the one or more light sources 102 can be determined by the position of the toggle switch 602. For example, the user can manually determine (e.g., configure, map out, etc.) an exit light pattern by selecting the position of the toggle switches 602 on each of the electrical device attachments.

In some embodiments, the position of the toggle switch 602 of one electrical device attachment can determine the direction of light emitted by one or more light sources 102 disposed on different electrical device attachments. Each of the electrical device attachments can be communicatively coupled with each of the other electrical device attachments. For example, the electrical device 104 located in the master suite can have a toggle in the left position such that the one or more light sources 102 emit light in the leftward direction. The leftward direction of the emitted light can direct a user towards the target location 204. The electrical device 104 located just outside of the master suite can have a toggle in the left position such that the one or more light sources 102 emit light in the leftward direction. The leftward direction of the emitted light can direct a user towards the target location 204. The electrical device 104 located living room can have a toggle in the right position such that the one or more light sources 102 emit light in the rightward direction. The rightward direction of the emitted light can direct a user towards the target location 204.

In some embodiments, the controller 106 can be communicatively coupled to one or more auxiliary units 108. For example, the controller 106 can be coupled to the auxiliary unit 108 located in the master suite, the auxiliary unit 108 located in bedroom 2, the auxiliary unit 108 located in bedroom 3, the auxiliary unit 108 located in the kitchen, and the auxiliary unit 108 located in living room. The controller 106 can be connected to the auxiliary units 108. For example, the controller 106 can be connected to the auxiliary units 108 through a wired connector or a wireless connection. An additional unit (e.g., additional detector, intermediate detectors, etc.) can be disposed between the controller 106 and the auxiliary unit 108. The additional unit can allow the controller 106 to determine which auxiliary unit 108 sent the signal 110. For example, the controller 106 can determine that the auxiliary unit 108 located in the living room emitted the signal 110 (e.g., the controller 106 can determine that the detector in the living room initiated an alarm). Based on the information that the auxiliary unit 108 in the living room emitted the signal 110, the controller 106 can determine which exit pattern the controller 106 should deploy. For example, the controller 106 can determine that an exit pattern leading to the target location 204 should be deployed. The controller 106 can control the one or more light sources 102 to emit light to provide an exit pattern leading to the target location 204. The controller 106 can determine which of the one or more light sources 102 to initiate.

In some embodiments, the one or more light sources 102 can be part of a flooring system (e.g., embedded in baseboards). For example, the one or more light sources 102 can be embedded in the floor. The one or more light sources 102 can be arranged in a pattern such that the one or more light sources 102 can illuminate a path to the target location 204. In some embodiments, the one or more light sources 102 can be removeably attached to the electrical device 104.

In some embodiments, the one or more light sources 102 can include one or more audible sources. For example, the one or more audible sources can transmit audible signals to provide indication of an exit path. The one or more audible sources can include a speaker or audio device. The one or more audible sources can be built into the electrical devices 104. The one or more audible sources can transmit audible signals of varying pitch to indicate a direction to or position of the target location 204. For example, the one or more audible sources can transmit audible signals of increasing pitch in the direction 202 to the target location 204. An audible source that is closer to the target location 204 can have a different pitch than an audible source that is further from the target location 204. For example, the audible source that is closer to the target location 204 can have a higher pitch than the audible source that is further from the target location 204.

In some embodiments, the target location 204 is located near a door or doorway. For example, a door can separate the target location 204 from an interior of a house or residence. The target location 204 can include an exit door. In some embodiments, one or more light sources 102 can be located proximate the door or in the doorway near the target location 204. The one or more light sources 102 can emit flashing lights to provide an indication that the door is the exit door. The one or more light sources 102 can emit colored light to provide an indication that the door is the exit door. For example, the one or more light sources 102 near the exit door can flash "green" to indicate that the door is the exit door. The one or more light sources 102 can emit flashing lights to provide an indication that the doorway leads to the target location 204. The one or more light sources 102 can emit colored light to provide an indication that the doorway leads to the target location 204. For example, the one or more light sources 102 in the doorway that leads to the target location 204 can flash "green" to indicate that the doorway leads to the target location 204.

Figure 7:
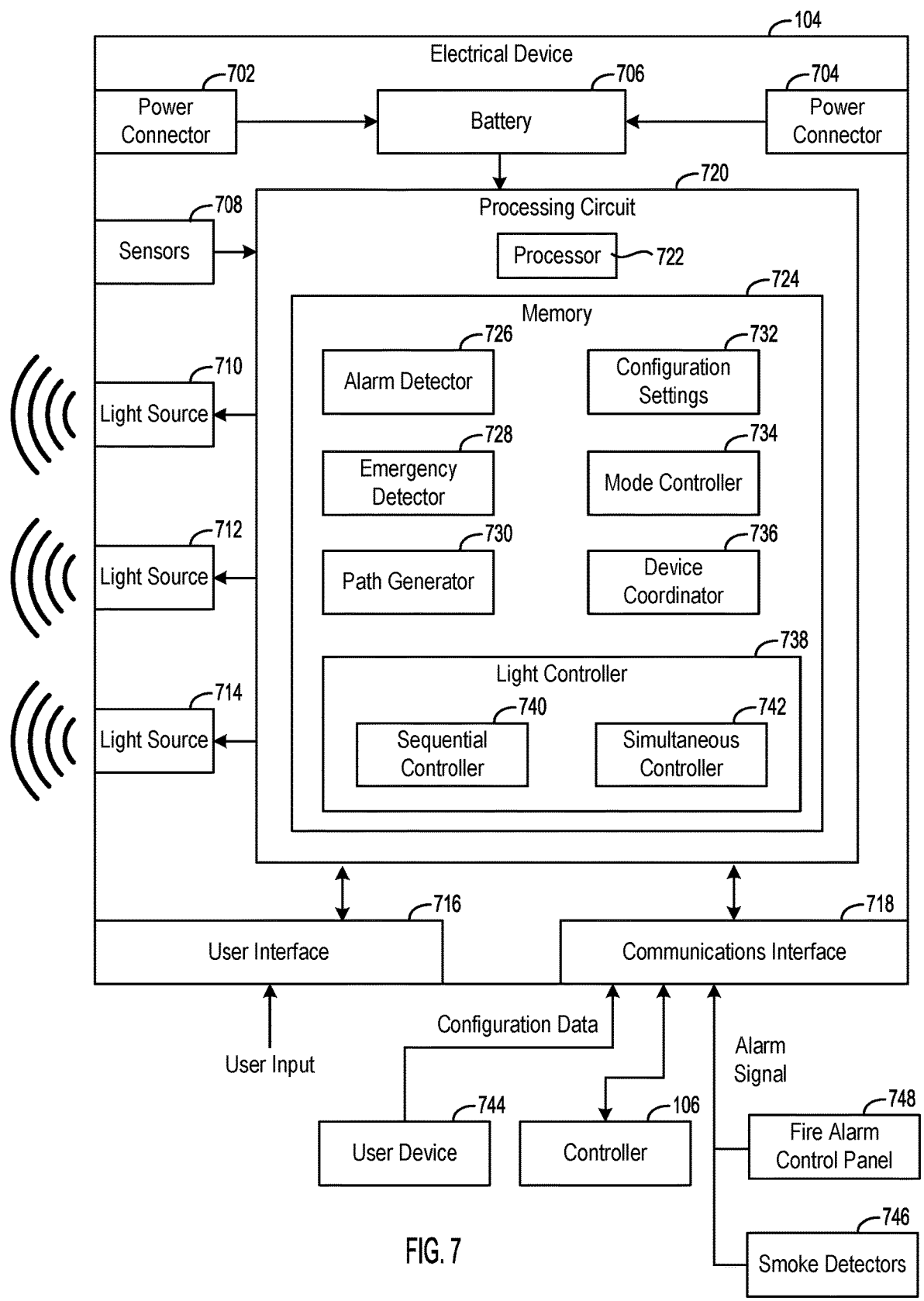
FIG. 7 illustrates one of the electrical devices in greater detail, according to an embodiment.

Referring now to FIG. 7, a block diagram illustrating various functional components of the electrical device 104 in greater detail is shown, according to an exemplary embodiment. The electrical device 104 is shown to include power connectors 702-704 and a battery 706. As shown in FIG. 8B, the power connectors 702-704 may extend from a rear surface of the electrical devices 104 (i.e., the surface facing toward the wall when the electrical devices 104 are installed) such that the power connectors 702-704 extend into the wall. The power connectors 702-704 may be configured to align with the screws on the sides of the electrical outlet that fasten the power wires to the electrical outlet. The power connectors 702-704 may make electrical contact with the screws on the sides of the power outlet (e.g., by clipping onto the screws from the sides) and draw power from the residential power supply that supplies power to the electrical outlet. Power drawn from the residential power supply may be stored within the battery 706.

In some embodiments, the power connectors 702-704 may include wireless energy harvesting devices (e.g., loop antennas) configured to draw power from power lines within the wall without making electrical contact. For example, the power connectors 702-704 may be positioned close to the power lines inside the wall (e.g., within 0-3 inches) such that the power connectors 702-704 are exposed to the electromagnetic field created by electric current flowing through the power lines. The electromagnetic field may surround the power lines and may be strongest near the power lines. The electromagnetic field may induce current to flow through the power connectors 702-704, which may be stored in the battery 706 as electric energy. The battery 706 may be configured to power the functional components of the electrical device 104 including, for example, the light sources 102 (shown in FIG. 7 as light sources 710, 712, and 714), sensors 708, a processing circuit 720, a user interface 716, and a communications interface 716.

The sensors 708 may include any of a variety of environmental sensors configured to measure environmental conditions in a space within which the electrical device 104 is installed. For example, the sensors 708 may include temperature sensors, humidity sensors, carbon dioxide sensors, carbon monoxide sensors, particulate matter sensors, smoke sensors, light or optical sensors, sound sensors (e.g., a microphone), capacitive sensors, and/or any other type of sensor. In some embodiments, the sensors 708 are capable of detecting a fire or other emergency within the building and provide fire detection data to the processing circuit 720. For example, the sensors 708 can provide fire detection data to the processing circuit 720 in response to measuring a high temperature, in response to detecting smoke, in response to capturing images of a fire, in response to recording audio of a fire, or any other type of measurement that indicates a fire within the building.

The user interface 716 may include one or more user input devices capable of receiving input from a user and/or user output devices capable of providing output to a user. For example, the user interface 716 may include one or more switches, buttons, dials, sliders, keys, or other user-operable elements capable of being physically operated by a user. In some embodiments, the user interface 716 includes a touch-sensitive panel (e.g., a capacitive or resistive touch screen) capable of receiving touch input from a user. The user interface may include various output devices such as a display screen, a speaker, a tactile feedback device, or other interface devices capable of presenting information to a user. In some embodiments, the user interface 716 allows the user to set a mode of the electrical device 104 or adjust settings of the electrical device 104. For example, the user interface 716 may include a user interface element (e.g., a switch or button) that can be selected to switch the electrical device 104 between a coordinated operating mode in which the electrical device 104 coordinates with other electrical devices 104 when illuminating the light sources 710-714 and a standalone operating mode in which the electrical device 104 does not coordinate with other electrical devices 104 when illuminating the light sources 710-714. In some embodiments, the user interface 716 includes a user interface element that can be selected to switch the order or sequence in which electrical device 104 illuminates the light sources 710-714. For example, one sequence may cause the light sources 710-714 to be illuminated from right to left or top to bottom, whereas another sequence may cause the light sources 710-714 to be illuminated in the reverse sequence (e.g., from left to right, from bottom to top, etc.).

The communications interface 718 may include wired or wireless interfaces (e.g., jacks, antennas, transmitters, receivers, transceivers, wire terminals, etc.) for conducting data communications with various systems, devices, or networks. For example, the communications interface 718 may include an Ethernet card and port for sending and receiving data via an Ethernet-based communications network and/or a Wi-Fi transceiver for communicating via a wireless communications network. The communications interface 718 may be configured to communicate via local area networks or wide area networks (e.g., the Internet, a building WAN, etc.) and may use a variety of communications protocols. The communications interface 718 may be a network interface configured to facilitate electronic data communications between the electrical device 104 and various external systems or devices (e.g., a user device 744, the controller 106, a fire alarm control panel 748, smoke detectors 746, etc.). Although the communications interface 718 and the power connectors 702-704 are shown as two separate interfaces, in some embodiments, the communications interface 716 and the power connectors 702-704 may be provided as a single interface configured to electrically couple the electrical device 104 to a power source and facilitate communications between the electrical device 104 and other electrical devices 104 via power line communications (PLC). In such embodiments, communications may be wireless and/or via power line communications conducted via a power line (e.g., a wiring system) provided by a building electrical system.

In some embodiments, the electrical device 104 receives an alarm signal from the fire alarm control panel 748 or from the smoke detectors 746 via the communications interface 718. For implementations in which the electrical device 104 is installed in a commercial building (e.g., an office building, a store, etc.), a hospital, a school, or other building that includes a central fire alarm control panel 748, the alarm signal may be distributed from the fire alarm control panel 748 to various fire notification devices (e.g., aural alarms, flashing strobes, etc.) by electrical wiring that connects the fire alarm control panel 748 to the fire notification devices. The electrical device 104 may be wired into the same electrical circuit that connects the fire alarm control panel 748 to the fire notification devices and may receive the alarm signal from the fire alarm control panel 748 along with the fire notification devices.

For implementations in which the electrical device 104 is installed in a house, apartment, or other residential setting, the building may not include a fire alarm control panel 748. However, the building may include one or more smoke detectors 746 that communicate with each other via electrical wiring that connects the smoke detectors 746. For example, modern smoke detectors often include three wiring inputs. One wire (typically black) accepts a power input, a second wire (typically white) is neutral or ground, and a third wire is the intercommunication wire. When one of the smoke detectors 746 detects a fire or is triggered for testing, the smoke detector 746 sends a signal along the intercommunication wire to the other smoke detectors 746, causing all of the smoke detectors 746 to alarm simultaneously. The electrical device 104 may be connected to the same intercommunication wire that connects the smoke detectors 746 and may receive the alarm signal from the smoke detectors 746 when any of the smoke detectors 746 detect a fire.

In some embodiments, the electrical device 104 uses audio input recorded by the sensors 708 to determine whether a fire is detected in the building. For example, if the sensors 708 detect a sound that indicates the smoke detectors 746 are currently alarming (e.g., emitting a noise having a loudness that exceeds a threshold, emitting a noise that matches frequency characteristics of a fire alarm, emitting a noise having a predetermined pattern, etc.), the electrical device 104 may determine that a fire is present in the building and respond in the same manner as if the alarm signal were received via the communications interface 718.

The user device 744 may include a desktop computer, a laptop computer, a tablet, a smart phone, a workstation, a smart watch, a smart bracelet, a personal digital assistant (PDA), or any other type of user-operable device capable of communicating with the electrical device 104. Communications between the user device 744 and the electrical device 104 may be direct (e.g., via Wi-Fi, Bluetooth, near field communications, etc.) or via an intermediate network such as a LAN, WAN, or the Internet. In some embodiments, the user device 744 runs an application that is programmed to communicate with the electrical device 104. The application may allow the user to adjust configuration settings of the electrical device 104, change the operating mode of the electrical device 104, upload a floor plan of the building, coordinate the operations of multiple electrical devices 104 within the building, or otherwise interact with the electrical device. In some embodiments, the electrical device 104 runs a web server that generates a webpage (e.g., HTML) allowing the configuration settings of the electrical device 104 to be adjusted. The webpage can be accessed by the user device 744 via a LAN, a direct Wi-Fi connection, or other interaction with the electrical device 104 via the communications interface 718. The configuration settings can be stored in the memory 724 of the electrical device 104 as configuration settings 732.

In some embodiments, the application or webpage allows the user to upload a floorplan of the building and designate the locations of one or more electrical devices 104 on the floorplan. The application or webpage can allow a user to define walls, hallways, rooms, windows, exits, and other information that allows an optimal path to a fire exit or other target location to be generated. The floorplan can be used by various components of the electrical device 104 (e.g., the path generator 730, the light controller 738, etc.) to operate the light sources 710-714 as described in greater detail below.

The electrical device 104 is shown to include a processing circuit 720 having a processor 722 and memory 724. Processor 722 can be implemented as a general-purpose processor, an application specific integrated circuit (ASIC), one or more field programmable gate arrays (FPGAs), a group of processing components, or other suitable electronic processing components. Processor 722 may be configured to execute computer code or instructions stored in memory 724 or received from other computer readable media (e.g., CDROM, network storage, a remote server, etc.).

The memory 724 (e.g., memory, memory unit, storage device, etc.) may include one or more devices (e.g., RAM, ROM, Flash memory, hard disk storage, etc.) for storing data and/or computer code for completing or facilitating the various processes, layers and modules described herein. The memory 724 may be or include volatile memory or non-volatile memory.

The memory 724 may include database components, object code components, script components, or any other type of information structure for supporting the various activities and information structures described in the present application. According to an exemplary embodiment, the memory 724 is communicably connected to the processor 722 via the processing circuit 720 and includes computer code for executing (e.g., by the processing circuit 770 and/or the processor 722) one or more processes described herein.

The processing circuit 720 is shown to include an alarm detector 726 and an emergency detector 728. The alarm detector 726 can be configured to monitor the communications received via the communications interface 718 for an alarm signal from the fire alarm control panel 748, from the smoke detector 746, from the controller 106, or from any other alarm source. The alarm detector 726 can be configured to determine the particular type of alarm (e.g., a fire alarm, a severe weather alarm, an active shooter alarm, etc.). For example, a fire alarm may indicate a fire in the building, a severe alarm may indicate a tornado or other severe weather at the location of the building, an active shooter alarm may indicate an active shooter in the building. Each type of alarm may be associated with a different course of action for building occupants. For example, evacuating the building in case of a fire, moving to a basement of the building in case of severe weather, or sheltering in place in case of an active shooter. The alarm detector 726 may determine the type of alarm being received and communicate the type of alarm to the processing circuit 720.

The emergency detector 728 may be configured to detect an emergency in the building based on input from the sensors 708. For example, the sensors 708 may measure temperature, sound, particulate matter, smoke, carbon dioxide, carbon monoxide, or other building conditions that may indicate the presence of a fire or other emergency situation. The emergency detector 728 may process input from the sensors 708 and compare the input to predetermined criteria or thresholds. For example, the emergency detector 728 may determine whether the loudness of sound detected by the sensors 708 exceeds a loudness threshold for a predetermined amount of time. A sustained loud noise or loud beeping pattern may indicate that the smoke detectors 746 are currently alarming. Accordingly, the emergency detector 728 may determine that a fire is detected in response to determining that the sound detected by the sensors 708 exceeds a loudness threshold and/or matches a stored pattern associated with the smoke detectors 746. Similarly, the emergency detector 728 can be configured to detect other types of emergencies within the building or in an area around the building. In some embodiments, the emergency detector 728 uses input received via the communications interface 718 (e.g., emergency alerts, emergency weather notifications, etc.) to detect the emergency.

The processing circuit 720 is shown to further include a path generator 730. The path generator 730 can be configured to determine a path from the location of the electrical device 104 to a target location (e.g., target location 204). The target location 204 may be different depending on the type of alarm or emergency detected by the alarm detector 726 or the emergency detector 728. Based on the detected type of alarm or emergency, the path generator 730 may select a corresponding target location 204. For example, the target location 204 may be a fire exit if the detected type of alarm or emergency indicates a fire in the building, whereas the target location 204 may be a basement of the building if the detected type of alarm or emergency indicates severe weather.

In some embodiments, the path generator 730 is configured to select between a plurality of target locations 204 associated with the same type of alarm or emergency in response to information that indicates one of the target locations 204 would be advantageous or preferable. For example, the path generator 730 may be configured to select a particular fire exit that is closest to the location of the electrical device 104 or has a shortest travel path from the location of the electrical device 104. In some embodiments, the path generator 730 is configured to select a particular target location 204 based on the detected location of the fire or emergency in the building. For example, if a fire is detected in a particular room of the building, the path generator 730 may select a target location 204 that is accessible without passing through the room in which the fire is detected.

The path generator 730 can be configured to generate a path from the location of the electrical device 104 to the target location 204. The path generator 730 may use the floorplan of the building to determine a path that leads from the location of the electrical device 104 to the target location 204. In some embodiments, the path generator 730 generates a path that avoids a location at which a fire or other emergency is detected. The path generator 730 may use any of a variety of navigation or wayfinding approaches to create a path to the target location 204. In some embodiments, the path generator 730 determines whether any other electrical devices 104 are located along the generated path. If any other electrical devices 104 are located along the generated path, the path generator 730 may identify such devices and organize them into a sorted list identifying the order in which a user would encounter the other electrical devices 104 when following the generated path to the target location 204. The order of the electrical devices 104 along the path can be used by light controller 738 to coordinate the operations of multiple electrical devices 104.

The processing circuit 720 is shown to further include a mode controller 734. The mode controller 734 can be configured to determine and set an operating mode for the electrical device 104. In some embodiments, mode controller 734 sets the operating mode based on user input received via the user interface 716, based on configuration data stored in configuration settings 722, based on input received from an application or webpage via the communications interface 718, or other criteria. The operating modes capable of being selected by the mode controller 734 include a sequential operating mode in which the electrical device 104 illuminates the light sources 710-714 in a particular sequence (e.g., from left to right, from top to bottom, etc.) and a simultaneous operating mode in which the electrical device 104 illuminates all of the light sources 710-714 simultaneously. The operating modes may further include a standalone operating mode in which the electrical device 104 operates without coordinating with other electrical devices 104 and a coordinated operating mode in which the electrical device 104 coordinates with other electrical devices 104.

In some embodiments, the operating modes are not discrete such that more than one operating mode can be selected and used concurrently. For example, the mode controller 734 can select both the sequential operating mode and the coordinated operation mode and operate in both modes concurrently. In general, the operating modes can be divided into multiple groups of discrete operating modes. For example, one group (i.e., "group A") may include the sequential operating mode and the simultaneous operating mode, whereas a second group (i.e., "group B") may include the standalone operating mode and the coordinated operating mode. The mode controller 734 may select one operating mode from each group. If each group contains two operating modes, this results in four potential combinations of operating modes (i.e., sequential-standalone, sequential-coordinated, simultaneous-standalone, and simultaneous-coordinated). The selected operating mode or modes can be provided to light controller 738 for use in controlling the light sources 710-714.

The processing circuit 720 is shown to further include a device coordinator 736. The device coordinator 736 can be configured to coordinate the operations of multiple electrical devices 104 when operating in the coordinated operating mode. Coordinating the operations of multiple electrical devices 104 may include determining the appropriate times (or timing) at which each of the electrical devices 104 should illuminate its light sources 710-714 to guide a building occupant toward the target location 204. The times or timing may be based on the order or sequence in which the building occupant would encounter each of the electrical devices 104 when following the generated path toward the target location 204. For example, the device coordinator 736 may rank or sort the electrical devices 104 into an ordered list based on the order or sequence in which the building occupant would encounter each of the electrical devices 104 when following the generated path toward the target location 204. The first electrical device 104 in the list may be the first electrical device 104 encountered by the user along the generated path, whereas the last electrical device 104 in the list may be the last electrical device 104 encountered by the user along the generated path. The device coordinator 736 may generate an operating sequence that causes each of the electrical devices 104 in the sorted list to illuminate its light sources 710-714 in the same order as the sorted list.

For example, referring to FIG. 9, a floorplan 900 of a building is shown. The locations of several electrical devices 104 are marked in the floorplan 900 as electrical devices 104A, 104B, 104C, 104D, and 104E (collectively electrical devices 104). A path 902 is shown leading from the bedroom 904 to the target location 204. The electrical devices 104A, 104B, 104C, and 104D are located along the path 902, whereas the electrical device 104E is not located along the path 902. The path 902 may be generated by the path generator 730 of any of the electrical devices 104 located along the path 902. The device coordinator 736 may determine that a building occupant following the path 902 would first encounter electrical device 104A, followed by electrical device 104B, then electrical device 104C, and finally electrical device 104D. Accordingly, the order in which the device coordinator 736 may cause the light sources 710-714 of each electrical device 104A-104D to be illuminated would be encounter electrical device 104A, followed by electrical device 104B, then electrical device 104C, and finally electrical device 104D.

The device coordinator 736 may generate a light timing sequence for the electrical devices 104 to follow. The light timing sequence may arrange the electrical devices 104 in the same order as the ordered list, with each of the electrical devices 104 offset by a predetermined amount of time. For example, the first electrical device 104A may be set to illuminate its light sources 710-714 at the beginning of the sequence at time $t_1$, whereas the second electrical device 104B may be set to illuminate its light sources 710-714 at time $t_2$, where $t_2=t_1+delay$. The delay represents the amount of time after the beginning of the sequence at which the second electrical device 104B illuminates its light sources 710-714. The delay may be in the range of 0.1 seconds to 1.0 seconds in some embodiments, but it is contemplated that other values for the delay (e.g., less than 0.1 seconds, greater than 1.0 seconds) can be used without departing from the teachings of the present disclosure. Following this same pattern, the third electrical device 104C may be set to illuminate its light sources 710-714 at time $t_3$, where $t_3=t_2+delay$, and the fourth electrical device 104C may be set to illuminate its light sources 710-714 at time $t_4$, where $t_4=t_3+delay$. In some embodiments, each electrical device 104 in the sequence deactivates its light sources 710-714 when the next electrical device 104 in the sequence illuminates its light sources 710-714. In other embodiments, the light sources 710-714 of each electrical device 104 in the sequence remain illuminated until the end of the sequence period. The sequence period may be a predetermined amount of time sufficient for all of the electrical devices 104 in the sequence to illuminate their light sources 710-714 (e.g., 1-3 seconds). In some embodiments, the order or sequence generated by the device coordinator 736 is repeated at the end of the sequence period.

The light controller 738 may be configured to operate the light sources 710-714 of the electrical device 104 based on the selected operating mode and/or the timing sequence generated by device coordinator 736. The light controller 738 is shown to include a sequential controller 740 and a simultaneous controller 742. The sequential controller 740 can be configured to operate the light sources 710-714 when the mode controller 734 selects the sequential operating mode. The sequential operating mode may be used to indicate a particular direction to the building occupant using only the light sources 710-714 coupled to a single electrical device 104. For example, the sequential operating mode may include illuminating the light source 710, waiting for a predetermined delay, illuminating the light source 712, waiting for the predetermined delay again, and finally illuminating the light source 714. This may signal to the building occupant to move in a direction that points from the light source 710 to the light source 714. Depending on how the light sources 710-714 are arranged on the electrical device 104, this may cause the building occupant to move to the left, to the right, or any other direction. Of course, the sequential operating mode can also be used to indicate the opposite direction to the building occupant by illuminating the light sources 710-714 in the reverse sequence (e.g., illuminating the light source 714, waiting for a predetermined delay, illuminating the light source 712, waiting for the predetermined delay again, and finally illuminating the light source 710).

The sequential controller 740 can be configured to determine the orientation of the electrical device 104 along the path 902 to the target location 204 and generate a lighting sequence that aligns with the direction of the path 902. For example, if the path 902 points from the left side of the electrical device 104 toward the right side of the electrical device 104, the sequential controller 740 may generate a lighting sequence that causes the left-most light source 710-714 to be illuminated first, followed by the middle light source 710-714, and finally the right most light source 710-714. Of course, it is possible for the electrical device 104 to include more than three light sources 710-714, in which case the lighting sequence would by adjusted to include all of the light sources in the appropriate order. The order in which the sequential controller 740 illuminates the light sources 710-714 may guide the building occupant in the correct direction along the path 902, leading toward the next electrical device 104 along the path 902 and ultimately to the target location 204.

The simultaneous controller 742 may be configured to operate the light sources 710-714 when the mode controller 734 selects the simultaneous operating mode. The simultaneous operating mode may include illuminating all of the light sources 710-714 of a given electrical device 104 simultaneously rather than in a particular sequence or order. However, the simultaneous controller 742 can still coordinate the illumination of the light sources 710-714 of the local electrical device 104 with one or more other electrical devices 104 based on the timing sequence or order generated by the device coordinator 736. The timing sequence generated by the device coordinator 736 can be used by both the sequential controller 740 and the simultaneous controller 742 to coordinate the operations of multiple electrical devices 104 in both the sequential mode and the simultaneous mode.

Referring now to FIG. 10, an illustration of the electrical device 104 installed within a hallway 1000 is shown, according to an exemplary embodiment. In the embodiment illustrated in FIG. 10, the electrical device 104 may be configured to project a path onto a floor or other surface of a space in which the electrical device 104 is located. For example, each of the light sources 710-714 may be configured to emit light toward the floor to create one of arrows 1002, 1004, and 1006. Arrows 1002-1006 can be created by emitting light through arrow-shaped apertures in the housing of electrical device 104 or by using directed lighting elements (e.g., lasers, light guides, etc.) as the light sources 710-714. In some embodiments, each of light sources 710-714 can be adjusted (e.g., manually by a user or automatically by electrical device 104) to cause the arrows 1002-1006 to be projected onto a different location. Although arrows 1002-1006 are shown in FIG. 10, it is understood that any shape can be used. For example, arrows 1002-1006 can be replaced with circles, rectangles, or any other shape. Electrical device 104 can be configured to illuminate light sources 710-714 in a particular sequence or simultaneously, as previously described, to cause arrows 1002-1006 to be projected onto the floor of the space in the event of a fire or other emergency.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A lighting system for an electrical device, comprising:
one or more light sources coupled to an electrical outlet, the one or more light sources comprising a first light source, a second light source, and a third light source, and the one or more light sources configured to receive power from a power supply and configured to generate output light on at least one side edge of the electrical device; and
a controller communicatively coupled to the one or more light sources, the controller configured to:
receive a signal from an auxiliary unit; and
control the one or more light sources to operate between an on-state and an off-state responsive to the signal from the auxiliary unit to indicate a direction of a first target location by:
illuminating the first light source and waiting for a predetermined delay before illuminating the second light source;
illuminating the second light source and waiting for the predetermined delay before illuminating the third light source; and
illuminating the third light source;
determine, based on a location of the auxiliary unit, that the first target location is inaccessible; and
control the first light source, the second light source, and the third light source to indicate a direction of a second target location.

2. The lighting system of claim 1, wherein the controller is configured to control the one or more light sources to operate sequentially between the on-state and the off-state to indicate the direction of the first target location and then the second target location.

3. The lighting system of claim 1, wherein the controller is configured to control the one or more light sources to generate the output light on an indicator side of the at least one side edge of the electrical device, the indicator side to indicate the direction of the first target location and then the second target location.

4. The lighting system of claim 1, wherein the controller is configured to control the one or more light sources to generate the output light on an indicator side of the at least one side edge of the electrical device based on a position of a toggle switch.

5. The lighting system of claim 1, wherein the controller is configured to:
control the one or more light sources to generate the output light on an indicator side of the at least one side edge of the electrical device, the indicator side to indicate the direction of the first target location and then the second target location.

6. The lighting system of claim 1, wherein the controller is configured to:
determine a path to the first target location and the second target location; and
control the one or more light sources to operate sequentially between the on-state and the off-state to indicate the path to the first target location and then the second target location.

7. The lighting system of claim 1, wherein the auxiliary unit is at least one of a smoke detector or a heat sensor.

8. The lighting system of claim 1, wherein the controller is configured control the one or more light sources responsive to an audio alarm.

9. The lighting system of claim 1, further comprising:
one or more batteries configured to supply the power to the one or more light sources.

10. A lighting system for electrical devices, comprising:
a first light source coupled to a first electrical outlet, the first light source configured to generate a first output light on a first side edge of a first electrical device of the electrical devices;
a second light source coupled to a second electrical outlet, the second light source configured to generate a second output light on a second side edge of a second electrical device of the electrical devices;

a third light source coupled to a third electrical outlet, the third light source configured to generate a third output light on a third side edge of a third electrical device of the electrical devices; and a controller communicatively coupled to the first light source, the second light source, and the third light source, the controller configured to:

determine a path to a first target location;

receive a signal from a secondary unit;

control the first light source, the second light source, and the third light source to operate between a lit state and an unlit state responsive to the signal from the secondary unit to indicate a direction of the first target location by:

illuminating the first light source in a direction of the second light source;

illuminating the second light source in a direction of the third light source; and illuminating the third light source in the direction of the first target location;

determine, based on a location of the secondary unit, that the first target location is inaccessible; and control the first light source, the second light source, and the third light source to operate between the lit state and the unlit state to indicate a direction of a second target location.

11. The lighting system of claim 10, wherein the controller is configured to:

determine the first target location and the second target location; and control the first light source, the second light source, and the third light source to blink in a sequential pattern responsive to the signal from the secondary unit.

12. The lighting system of claim 10, wherein the controller is configured to:

determine the direction of the first target location and the second target location; and control the first light source, the second light source, and the third light source to blink in a pattern based on the direction of the first target location and then the second target location.

13. The lighting system of claim 10, wherein the controller is configured to control the first light source, the second light source, and the third light source to operate sequentially between the lit state and the unlit state to indicate the path to the first target location and then the second target location.

14. The lighting system of claim 10, wherein the secondary unit is a smoke detector, a heat detector, or a sprinkler activation signal.

15. The lighting system of claim 10, wherein the controller is configured to control the first light source, the second light source, and the third light source responsive to an alarm.

16. The lighting system of claim 10, further comprising:

one or more batteries configured to supply power to the first light source, the second light source, and the third light source.

17. An emergency exit lighting system for a building, comprising:

a first light source coupled to a first electrical outlet, the first light source configured to generate a first light signal;

a second light source coupled to a second electrical outlet, the second light source configured to generate a second light signal;

a third light source coupled to a third electrical outlet, the third light source configured to generate a third light signal;

a controller communicatively coupled to the first light source, the second light source, and the third light source, the controller configured to:

receive an emergency signal from a secondary unit indicating a presence of an emergency exit condition;

in response to the emergency signal, prepare a first sequentially progressing illumination pattern of the first light signal, the second light signal, and the third light signal to create a directional indication visually leading toward an exit location from the building;

recognize a location of the emergency exit condition from the secondary unit;

determine that the location of the emergency exit condition is proximate the exit location; and responsive to the determination that the location of the emergency exit condition is proximate the exit location, create a second sequentially progressing illumination pattern of the first light signal, the second light signal and the third light signal to create a directional indication visually leading toward an alternative exit location from the building, the second sequentially progressing illumination pattern different from the first sequentially progressing illumination pattern.

* * * * *